(12) United States Patent
Nabok

(10) Patent No.: US 7,523,877 B2
(45) Date of Patent: Apr. 28, 2009

(54) DEVICE FOR SHREDDING WORNOUT TIRES

(75) Inventor: Alexandr Andreevich Nabok, ul.Khabarovskaya, d.23, korp1, kv.16, 107065 Moscow (RU)

(73) Assignees: Alexandr Sergeevich Zakharov, Moscow (RU), part interest; Alexandr Andreevich Nabok, Moscow (RU), part interest ( * ) Notice: Subject to any disclaimer, the term of this patent is extended or adjusted under 35 U.S.C. 154(b) by 0 days.

(21) Appl. No.: 10/363,102

(22) PCT Filed: May 31, 2001

(86) PCT No.: PCT/RU01/00210

§ 371 (c)(1), (2), (4) Date: Jul. 25, 2003

(87) PCT Pub. No.: WO02/18114

PCT Pub. Date: Mar. 7, 2002

(65) Prior Publication Data

US 2004/0011902 A1 Jan. 22, 2004

(30) Foreign Application Priority Data

Aug. 31, 2000 (RU) .............................. 2000122720

(51) Int. Cl.
*B02C 19/00* (2006.01)
(52) U.S. Cl. .......................................... 241/1; 241/301
(58) Field of Classification Search ...................... 241/1, 241/65, 301, DIG. 31, DIG. 30
See application file for complete search history.

(56) References Cited

U.S. PATENT DOCUMENTS 2,318,693 A * 5/1943 Joyce et al. ..................... 241/1
6,056,216 A * 5/2000 Nabok ............................ 241/1

FOREIGN PATENT DOCUMENTS

| RU | 2057014 | | 3/1996 |
| RU | 2093268 | | 10/1997 |
| RU | 2096174 | | 11/1997 |
| RU | 2106963 | | 3/1998 |
| RU | 2140358 | | 10/1999 |
| SU | 633601 | | 11/1978 |
| SU | 1752562 | | 3/1990 |
| WO | WO 97/05995 | * | 2/1997 |
| WO | WO99/12717 | | 3/1999 |
| WO | WO99/47326 | | 9/1999 |

* cited by examiner

*Primary Examiner*—Bena Miller
(74) *Attorney, Agent, or Firm*—Collard & Roe, P.C.

(57) ABSTRACT

Method and device are for recycling wornout tires and other industrial and domestic wastes. According to a method for shredding wornout tires a package of wornout tires is formed as a number of closely compacted layers. The package is subjected to primary destruction in an armored chamber under conditions of free extension until the package outside layers are destroyed. The overall dimensions of the armored chamber in any cross-section thereof perpendicular to the chamber axis and passing through the package of the compacted tires varies within the range of from 2 to 7 package diameters in such section. The compact package of tires is formed from a few coaxial helical twists having an axial hole. Accordingly, a stress-strain state is established upon free extension of a rubber layer without its contacting with the walls of the armored chamber, whereby efficient destruction and disintegration of the rubber, metallic and textile cord of a tire is attained.

7 Claims, 3 Drawing Sheets

DEVICE FOR SHREDDING WORNOUT TIRES

CROSS REFERENCE TO RELATED APPLICATIONS

Applicant claims priority under 35 U.S.C. §119 of Russian Application No. 2000122720 filed Aug. 31, 2000. Applicant also claims priority under 35 U.S.C. §365 of PCT/RU01/00210 filed May 31, 2001. The international application under PCT article 21(2) was not published in English.

TECHNICAL FIELD

The present invention relates to mechanical engineering, more specifically, to recycling wornout tires and other industrial and domestic wastes.

BACKGROUND ART

One prior-art method for disintegrating wornout metal-cord tires using mechanical shredding technique is known to use a shredder provided with two shafts rotating against each other and carrying blades held thereto (cf. USSR Inventor's Certificate #633, 601 IPC B 02 C 18106, published in 1978.

The method suffers from high power consumption, cumbersome equipment used, as well as a necessity for intermittently discontinuing the technological process for replacing high-mortality short-lived knife blades.

One more method for shredding wornout metal-cord-reinforced tire cases is known to comprise cooling the cases down to the state of embrittlement using liquefied nitrogen, followed by their being alternately broken and crushed mechanically, using a device having two disintegrators each appearing as a die and a punch, said method being proposed USSR Inventor's Certificate #1,752,562. However, the method involves high power consumption due to the use of liquefied nitrogen for cooling the tires to be shredded.

The closest to the herein-proposed method is a method for shredding wornout tires comprising forming and preparing a package of wornout tires, putting said package in an armored chamber provided with cutting ribs and grids, blasting the charge of an explosive inside said package, destructing the tires by the effect of explosion and action of the cutting members of the chamber, removing the products of explosion and destruction of the tires from said chamber. The method is protected by RF U.S Pat. No. 2,057,014, IPC B 29 B 17/00 and published in 1996.

A disadvantage inherent in said method resides in an inadequately high degree of comminution of the resultant rubber powder and a relatively low yield thereof per unit volume of the armored chamber.

The closest to the device proposed herein is a device for disintegrating wornout tires, comprising an armored chamber provided with cutting ribs and grids, means for loading the tires in the chamber and appropriately arranging them there, means for discharging explosion products and products of tire shredding, means for placing and blasting the explosive (cf. RF U.S Pat. No. 2,057,014, see above).

A disadvantage inherent in said device resides in an inadequately high degree of comminuting the resultant rubber powder and a relatively low yield there of per unit volume of said armored chamber.

The closest to the herein-proposed package is a compact package for shredding tires, appearing as a helical band prepared by separating the bead rings and side walls of a few tires, radially cutting the, tire treads, helically twisting the resultant raw band blanks successively one onto another, and fixing the shape of the resultant helical band (cf. PF U.S. Pat. No. 2,106,963, IPC B 29 B 17/00, published in 1998)

However, the aforesaid compact package shaped as a helical band fails to effect tire shredding with a high yield of rubber powder per unit volume of the armored chamber nor can it provide an efficient utilization of the power of an explosive.

DISCLOSURE OF THE INVENTION

The present inventions have for their primary and essential object to provide higher degree of shredding metal-cord reinforced tire cases and eliminating the aforementioned disadvantages inherent in the heretofore-known technical solutions.

Said object is accomplished due to the fact that in a known method comprising the formation and preparation of a package from the material of wornout tires, putting from the armored chamber aid package in an armored chamber, blasting an explosive charge inside said package, primary destruction and disintegration of the tires by virtue of explosion, and eliminating the explosion products and the material of the tires, said package is formed as a number of closely compacted layers, and primary destruction of the package is conducted under conditions of free extension until destruction of the external layers thereof occurs.

The term "free extension of the package under the effect of explosion" means herein such conditions that provide for primary destruction of the external package layers which occurs largely due to forming internal stresses in the bulk of the package as early as before the material of said layers start interacting with the walls of the armored chamber.

In a particular version of carrying said method into effect the technical problem is accomplished due to the fact that free radial motion of the closely compacted layers of tires occurs until a required outside package diameter is increased at least twice.

In a particular version carrying said method into effect the technical problem is accomplished due to the fact the ratio between the weight of the charge and the weight of the package of compressed tires is preset to be within 0.03 and 0.07.

The object of the invention is accomplished due to the fact that in a heretofore-known device, comprising an armored chamber, means for loading the tires into the chamber and appropriately arranging them therein, means for removing products of explosion and discharging products of shredding the tires, means for arranging the explosive in said chamber and blasting it therein, the characteristic dimension of the armored chamber in any cross section perpendicular to the chamber axis and passing through the compact package varies from 2 to 7 diameters of the compact package in said cross section.

In a particular variant of the device said technical problem is solved due to the fact that the diameter of the armored chamber varies from 2 to 7 diameters of the cylinder-shaped compact package.

In a particular embodiment of the device of the present invention the required technical result is attained due to the fact that the diameter of a spherical armored chamber is varied within 3 to 7 diameters of the cylinder-shaped compact package.

In a particular variant of the device the object of the invention is accomplished due to the fact that the diameter of a cone-shaped armored chamber in any cross section perpendicular to the axis thereof and passing through the compact package, varies within 2 to 7 diameters of the compact package in the same cross section.

The technical problem of the invention is solved due to the fact that in the known compact package comprising a number of raw blanks obtained from the tires and helically twisted one upon another in succession, the package is formed from a few coaxial helical twists having an axial hole.

In a particular embodiment of the compact package the raw blanks are prepared from the tires by separating such fragments thereof that comprise bead rings.

In another particular embodiment of the compact package the raw blanks are prepared from the tires by separating such fragments thereof that comprise bead rings and part of the tire side walls.

In one more particular embodiment of the compact package the raw blanks are prepared from the tires by separating such fragments thereof that comprise bead rings and all of the tire side walls.

In a still more particular embodiment of the compact package the ratio between the package diameter and the hole diameter in any cross section of the package perpendicular to the axis thereof ranges from 1.8 to 5.

In a further particular embodiment of the compact package it appears as a cylinder having a through hole, the ratio between the cylinder height and the diameter thereof ranges from 2 to 5.

In a still further particular embodiment of the compact package the ratio between the diameter of the package center hole in any cross section thereof perpendicular to the package axis ranges from 1.5 to 5.

In a yet still more particular embodiment of the package the desired technical result is attained due to the fact that the compact package appears as a cone frustum having an open-end center hole.

The essence of the herein-proposed method and device for carrying said method in effect resides in the fact that the herein-proposed combination of essential features makes possible realizing the conditions under which there occurs free (without direct contact with the walls and other components of the armored chamber) radial extension of the tire rubber layer and a stress-and-strain state is established which provides for the most effective destruction and shredding of rubber and metal-textile cord. The result of such an action is not only shredding of the tire rubber and cord but virtually complete separation from the metal cord (cf. examples of practical realization of the present invention stated below).

In the first phase of the action of explosion part of the tires may be disintegrated adjacent to the charge of explosive due to the shuttering action of the explosion, while in the second phase the closely compacted layers of the tires are subject to radial extension reaching the point of destructive deformations. Whenever the preparation of a package includes its cooling, finely divided rubber powder with the rubber granules sized under 1 mm is formed in the first phrase of action, while in the second phase of action there is formed a coarser fraction of larger granules sized about 2 mm. In the course of disintegration the rubber component of a tire gets fully rid of metal cord (the amount of rubber remaining bound with the metal cord is as low as 0.5% of a total weight of rubber component of the tires). Experiments have demonstrated that when the extension of the tire layers under the effect of explosion, (due to, e.g., interaction between the layers of the compact package and the stiffening ribs, walls of the armored chamber, and the cutting members thereof) the effectiveness of the method is affected adversely, and large fragments of the tires measuring up to 100 mm.

To provide an adequate yield of small-sized fractions of rubber powder rid of metal cord, the ratio between the weight of charge of an explosive and the weight of package should be set within the range of from 0.03 to 0.07 and the ratio between the diameter of the interior of the tire package and the diameter of the charge be in the range of from 1.5 to 5.0. To provide an adequate yield of rubber fractions rid of metal cord the ratio between the charge weight in terms of TNT equivalent and the weight of the tire package must be at least 0.03. An increase in said ratio above 0.07 fails to yield a perceptible increase in the degree of disintegration and results in an unjustified increase in the specific metal content of the armored chamber.

Disintegration according to the proposed method may be carried out in armored chambers of various shapes, e.g., cylindrical, spherical, toroidal, or in the form of a closed ring system, and others. In this connection, a prerequisite for restrictless expansion of the package of tires upon an explosion followed by at least a twofold increase of the package outside diameter shall be complied with, and the aforementioned ratios between the weight of the charge and that of the package, between the diameter of the package interior and that of the charge, and other prerequisites stated with reference to particular embodiments of the invention shall be observed.

The effect of an explosion produced on the tires, their destruction and shredding occur for a lapse of time lasting a few thousandths of a second. That is why the proposed invention is very effective when applied in a technological process of cooling the tires. since a brittle state of the tire rubber is retained throughout the entire process of destruction and disintegration. Said distinguishing feature enables one to dispense with deep chilling or cooling in the course of shredding which is resorted to in the heretofore-known technological process. The herein-proposed invention is applicable for shredding wornout tires using but non-deep cooling down to a temperature of from minus 60° C to minus 80° C. which is attainable without the use of liquefied nitrogen, e.g., by using cold-air turbo refrigeration machines. This allows of about fivefold reduction of power consumed for tire cooling. Cooling may be carried out using liquefied nitrogen but at a substantially lower consumption rate thereof.

DETAILED DESCRIPTION OF THE INVENTION

A general view of the device and the compact package for carrying the proposed method into effect is presented for a number of particular embodiments in FIGS. 1-4.

Figure 1:
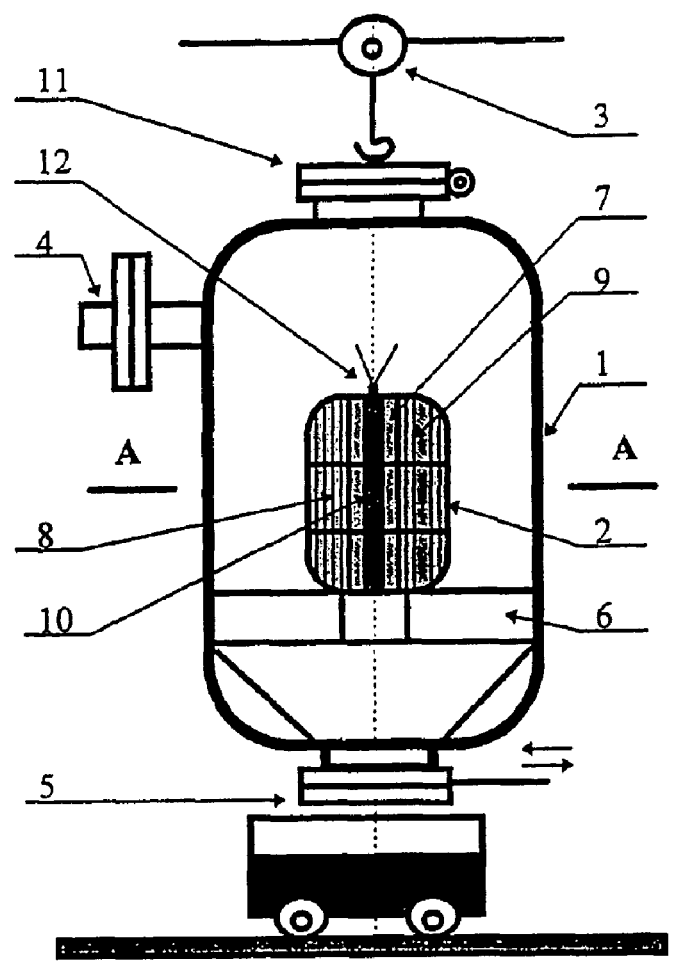
FIG. 1 represents an arrangement diagram of the cylinder-shaped compact package in a cylinder-shaped armored chamber.
Figure 3:
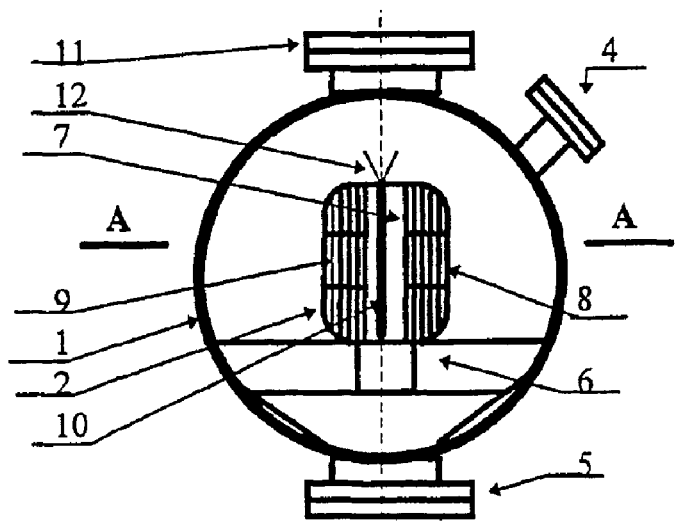
FIG. 3 represents an arrangement diagram of the cylinder-shaped compact package in a spherical armored chamber.

FIG. 1 represents a particular embodiment of the device having a cylinder-shaped armored chamber (1) and a cylinder-shaped compact package (2). The device comprises an armored chamber (1), means (3) for loading the compact package (2) compiled of wornout tires, into the armored chamber (1) and arranging said package therein, a means (4) for removing explosion products, means (5) for discharging the products of disintegration of the tires, means (6) for placing an explosive (10) in said chamber and blasting said explosive. The compact package (2) having an axial hole (7) is composed of a number of separate helical twists (8) formed of a few raw blanks (9) obtained from the tires and twisted helically one onto another in succession. In the general views of the device and compact package for carrying into effect the proposed method according to other particular embodiments of the invention shown in FIGS. 2-5, the same notation system of Ref. Nos. is used as the one described above with reference to FIG. 1. The parameters of the method and a general description of operation of the proposed device for all particular embodiments of the invention are described herein below. Specific description of the particular embodiments of the method, device, and compact package are described in detail in the examples of practical realization of the invention.

A compact package composed of wornout tires is first prepared. The preparation procedure may involve the following steps: washing the tires, separating the bead ring, cross cutting of the resultant raw blanks and successively twisting said blanks into a helical twist, forming a compact package by axially arranging the helical twists and holding them together to form a package, cooling the package with cold air or liquefied nitrogen. Then the package (2) is loaded into the armored chamber (1) through a joint (11), an elongated charge of an explosive (10) with an initiation means (12) placed therein is put into an interior (7) of the package (2). When putting the package (2) into the armored chamber (1), conditions should be provided for restrictless expansion of the package of tires upon explosion, with the resultant at least twofold increase in the outside package diameter, as well as for the 0.03-0.07 ratio between the weight of the charge and that of the package and the 1.5-5 ratio between the package interior diameter and the charge diameter, as well as other conditions in accordance with the aforementioned particular embodiments of the invention, particularly as regards the ratio between the dimensions in FIG. 5.

Figure 5:
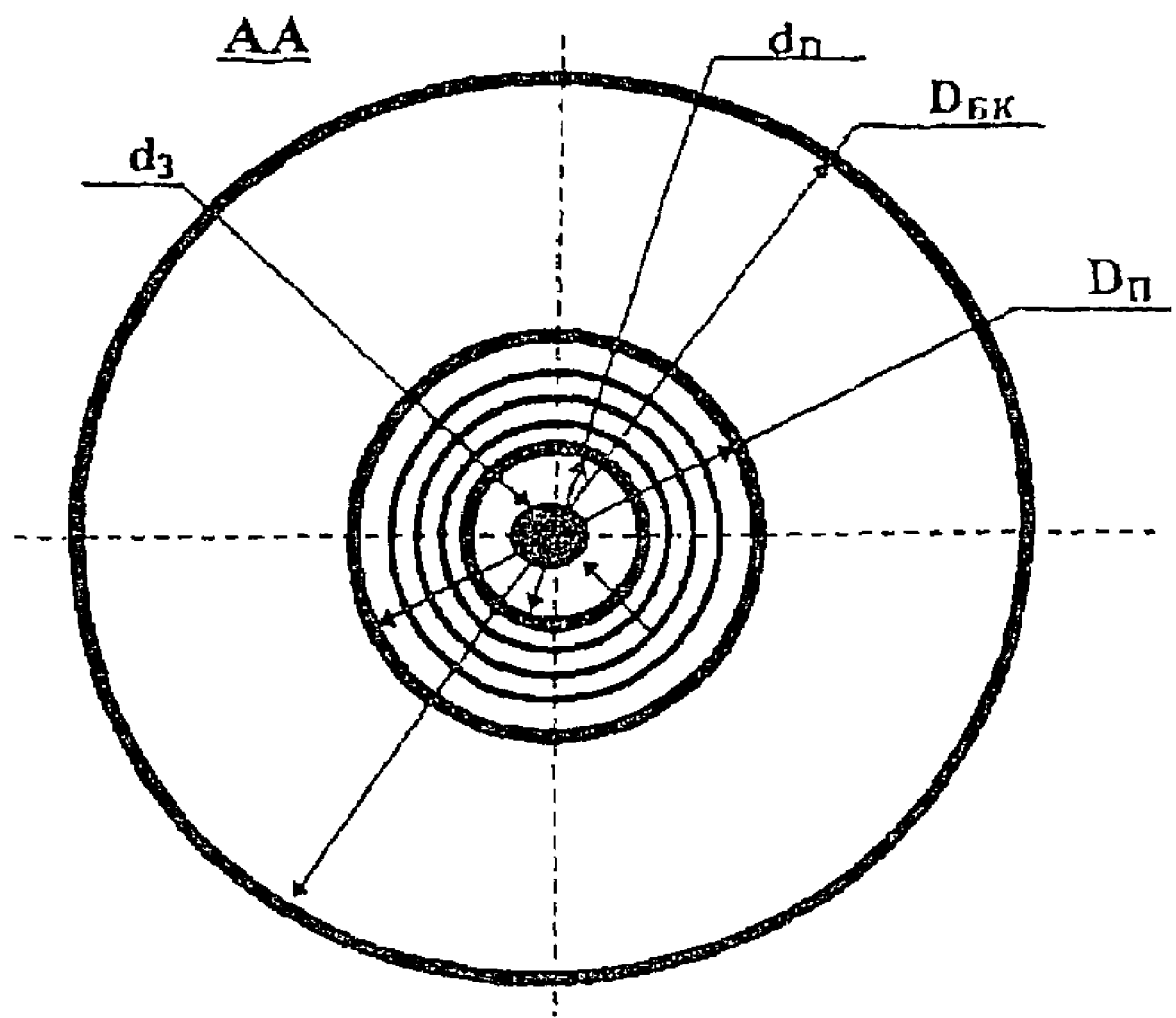
FIG. 5 represents a cross-sectional view of the armored chamber accommodating the compact package in a plane perpendicular to the chamber axis with reference to the principal dimensions and their ratios relevant to the subject matter of the present invention.

FIG. 5 shows the relationship between the following variables:

$D_{GK}$ -armored chamber diameter
$D_\Pi$ -tire package diameter
$d_3$ -explosive charge diameter
$d_n$ -diameter of the package interior
G -explosive charge weight
m -tire package weight $2 \leq D_{GK}/D_\Pi \leq 7$;

$1.5 \leq D_\Pi/d_3 \leq 5$;

$0.03 \leq G/m \leq 0.07$.

Next the explosive charge (13) is blasted. In the first phrase of action of the explosion of the charge there occur (13) intense loading and disintegrating (down to 1-2 mm) of the layers of tires of the package (2) adjacent to the interior (7) thereof.

During the second phase of action of the explosion there occur diametrical expansion of the cooled helical twists of the compact package (2), reducing the thickness of the compact package until the point of destructive deformation is reached, and a process of destruction of the rubber layer and cord to form rubber crumb and small-sized cord fragments. Such an efficient rubber shredding is fostered by the fact that metallic cord of tires moving at a high speed under the effect of explosion, exerts additional destructive action upon the rubber layer being expanded. It has been obtained experimentally rather unexpected result of a more efficient disintegration of tires with metallic rather than with textile cord. There has been demonstrated that when some obstacles are situated across the path of extension of the layers of the compact package (2), e.g., such as the inner wall of the armored chamber (1), cutting members, grids, stiffening ribs, and so on which restrict the process of explosion-induced expansion of the compact package, this results in an abrupt reduction in the destruction and disintegration efficiency of the cooled rubber layer of tires having metallic cord. Gaseous explosion products are removed either fully or partly from the armored chamber (1) with the aid of the means (4), and the products of destruction and disintegration of tires are withdrawn using the means (5). The products of destruction and disintegration of tires are then subjected to further treatment which may include such operations as separating the rubber powder from the fragments of metallic and textile cord, classifying the rubber powder into size fractions, and further mechanical disintegration of some fractions.

Figure 2:
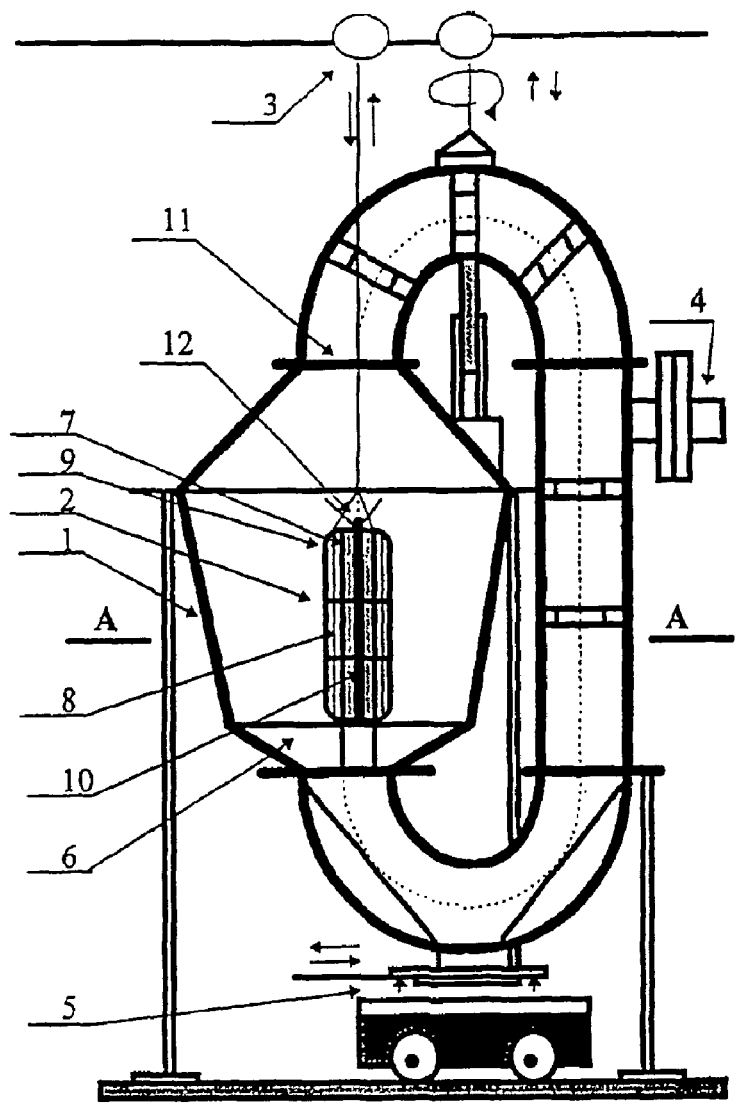
FIG. 2 represents an arrangement diagram of the cylinder-shaped compact package in a cone-shaped armored chamber.
Figure 4:
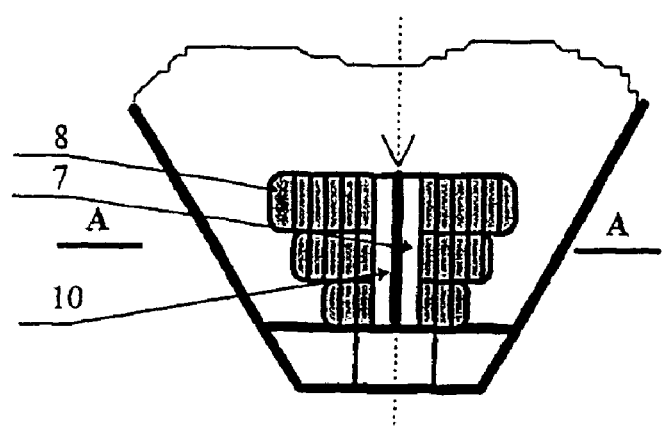
FIG. 4 represents a cross-sectional view of the cylinder-shaped compact package in a cone-shaped armored chamber along line A-A of FIG. 2.

The means for accommodating the explosive charge 10 is shown in FIG. 2 and in FIG. 4 as being placed within the axial hole 7 which is within the helical twists 8. The means for initiating an explosion is means 12 which is an explosive mixture, such as a mixture of 71% ammonium nitrate and 29% TNT.

Given below are some specific examples of carrying the method into effect. Operations left out of consideration in the Examples were performed in accordance with the aforementioned general description of the invention.

EXAMPLE 1

Type 6, 45-13 metal-cord-reinforced tires are subjected to shredding. First tire fragments are cut out including bead rings and one cross cut is made in each of the thus-obtained raw blanks. Then the raw blank prepared from the first tire is helically twisted to form a helical twist having dia. 140 mm. interior. Next another two raw blanks obtained from two tires are twisted successively one onto the other on the first helical twist obtained from the first tire, said raw blanks being obtained from two tires to form a helical twist of three bands. The outer tire is fixed in position by a nail. An outside diameter of the helical twist is about 360 mm. Then the thus-prepared compact package is cooled down to minus 80° C. using liquefied nitrogen. Then an explosive charge having the weight of 0.66 kg and having a diameter of 65 mm is put in the package interior, the explosive being used is a mixture of 71% ammonium nitrate and 29% TNT. The compact package with the explosive charge put there is placed in a steel cylinder-shape chamber having a diameter of 1800 mm. The ratio between the chamber diameter and the package diameter is 5 (1800:360=5). The weight of the compact package is 10.5 kg. The ratio between weight of charge and the weight of tires is 0.063 (0.66:10.5=0.063). The explosive charge is initiated from type ЭД#8 electric fuse.

The test results demonstrate that exposure of the tires to the effect of explosion yields the product having the following characteristics:

the tires turned completely into a mixture of rubber powder, treads of the textile cord, and short wires of the metallic cord which got rid of rubber completely;

the weight of the rubber powder fractions sized under 1 mm is 1.56 kg which makes up 14.7% of the weight of tires or 17.7% of a total weight of the rubber powder;

the weight of the rubber powder fractions sized from 1 to 2.5 mm is 2.44 kg which makes up 23% of the weight of tires or 27.7% of a total weight of the rubber powder;

the weight of the rubber powder fractions sized from 2.5 to 10 mm is 3.3 kg which makes up 31.1% of the weight of tires or 37.5% of a total weight of the rubber powder;

the weight of the rubber powder fractions sized from 10 to 20 mm is 1.5 kg which makes up 14.1% of the weight of tires or 17.5% of a total weight of the rubber powder;

the weight of wires of metallic cord 50 to 60 mm long with inclusions of textile cord (as fluff and threads) is 1.8 kg which makes up 17.1% of the weight of tires.

EXAMPLE 2

Type 6, 45-13 tires are subjected to shredding. First tire fragments are cut out including bead rings, and one cross cut is made in each of the thus-obtained raw blanks. Then the resultant raw blank prepared from one tire is helically twisted to form an interior about 100 mm in diameter. Another helical twist is rolled onto the outer surface of the previous helical twist to form a helical twist from the bands of two tires. The band disposed on the outer surface of the compact package is fixed in position with a metal clip. The outside diameter of such a helical twist is about 300 mm. Further three such helical twists are prepared in a similar way. Then the four twists are coaxially arranged one onto another to form a compact package about 800 mm high and about 300 mm in diameter. The ratio between the package height and the outside diameter thereof is about 2.7. The package is cooled in a bath filled with liquefied nitrogen down to minus 80° C., is withdrawn and a cylindrical explosive charge 1.6 kg in weight and 48 mm in diameter is put into the package interior, said explosive being in fact a mixture of 71% ammonium nitrate and 29% TNT. Then the package of tires with the explosive charge put thereinto is placed in cone-shaped steel chamber provided with a bent outside piping to form a closed circular system for circulation of explosion products. The diameter of the greater base of the cone frustum of the armored chamber shell is 1538 mm, and the diameter of the lesser base thereof is 462 mm and is equal to the inside diameter of the circular system piping. The ratio between the diameter of the greater base of the cone frustum and the diameter of the tire package is 1538:300=5.1267. Grids with mesh measuring 100×100 mm are provided in the bent piping. The ratio between the diameter of the package interior and the charge diameter is 2.1 (100:48=2.1). A distance from the package outer surface to the chamber wall is (1538-100):2=719 mm; the ratio between the armored chamber diameter (D) and the package diameter ($D_p$) is 4.793 (2×719:300=4.793). The package weight is 39 kg and the ratio between the weight of the explosive charge (1.6 kg) and the package weight is 0.041 (1.6:39=0.041). The explosive charge is initiated by electric fuse ЭД#8.

The test results demonstrate that exposure of the package of tires to the effect of explosion yields the product having the following characteristics:

the tires turned completely into a mixture of rubber powder, treads and fluff of the textile cord, and short wires of the metallic cord which got rid of rubber completely;

the weight of the rubber powder fractions sized under 1 mm is 16.07 kg which makes up 41.2% of the package weight or 48.43% of a total weight of the rubber in the package;

the weight of the rubber powder fractions sized from 1 to 2.0 mm is 10.74 kg which makes up 27.5% of the package weight or 32.4% of a total weight of the rubber powder;

the weight of the rubber powder fractions sized from 2.0 to 4 mm is 4.66 kg which makes up 11.95% of the package weight or 13.06% of a total weight of the rubber powder;

the weight of the rubber powder fractions sized from 4 to 10 mm is 1.66 kg which makes up 4.25% of the package weight or 5% of a total weight of the rubber powder;

the weight of wires of metallic cord 50 to 60 mm long with inclusions of textile cord (as fluff and threads) is 5.8 kg which makes up 15% of the weight of package of tires.

EXAMPLE 3

Type 6, 45-13 tires are subjected to shredding. A compact package is prepared as described in Example 2, having an outside diameter of about 300 mm, a height of about 800 mm and the diameter of interior about 100 mm. The package is cooled in a bath filled with liquefied nitrogen down to minus 80° C. and withdrawn from the bath, whereupon a cylinder-shaped explosive charge 1.6 kg in weight and 43 mm in diameter is put into the package interior, said charge being in fact a mixture of ammonium nitrate (71%) and TNT (21%). Then the package of tires with the explosive charge put thereinto is placed in a spherical steel chamber 1500 mm in diameter. The chamber diameters in two cross sections perpendicular to the chamber axis and passing in the region of the top and bottom helical twists of the package are approximately the same and amount to about 1200 mm, and the ratio between said diameters and the package diameter (300 mm) is about 4. The ratio between diameter of the package interior and the explosive charge diameter is 2.1 (100:48=2.1).

The package weight is 39 kg and the ratio between the weight of the explosive charge and the package weight is 0.041 (1.6:39=0.041). The explosive charge is initiated by the electric fuse ЭД#8.

The test results demonstrate that exposure of the package of tires to the effect of explosion yields the product having the following characteristics:

the tires turned completely into a mixture of rubber powder, treads of the textile cord, and short wires of the metallic cord which got rid of rubber completely;

the weight of the rubber powder fractions sized under 1 mm is 5.7 kg which makes up 14.7% of the package weight or 17.7% of a total weight of the rubber in the package;

the weight of the rubber powder fractions sized from 1 to 2.5 mm is 8.97 kg which makes up 23% of the package weight or 27.7% of a total weight of the rubber powder;

the weight of the rubber powder fractions sized from 2.5 to 10 mm is 12.1 kg which makes up 31% of the package weight or 37.5% of a total weight of the rubber powder;

the weight of the rubber powder fractions sized from 10 to 22 mm is 5.5 kg which makes up 14.1% of t he package weight or 17.5% of a total weight of the rubber powder;

the weight of wires of metallic cord 50 to 60 mm long with inclusions of textile cord (as fluff and threads) is 6.6 kg which makes up 17% of the weight of package of tires.

INDUSTRIAL APPLICABILITY

In view of the foregoing, the proposed method and device for carrying it into effect enable one to considerably add to the effectiveness of the explosion and not only shred the tire but also attain a high degree of disintegration of the resultant tire fragments.

Practical realization of the method involve use of simple equipment and the preblasting procedure consists of simple operations which can be mechanized and automated.

In addition, practical application of the technological features of the proposed method makes possible considerable reduction in power consumption and rendering the process of tire destruction and disintegration less costly.

The invention claimed is:

1. A device for shredding wornout tires, comprising:
an armored chamber having side walls;
a compact tire package arranged coaxially in said armored chamber and having a center hole for accommodating explosive charge;
said compact tire package made up of a number of coaxially arranged one upon another helical twists;
each of said helical twists made of a number of helically twisted raw blanks put one onto another;
each of said raw blanks appearing as a band made up of one worn-out tire by separating metal bead ring and cross-cutting of said wornout tire;
free space established between the inner surface of said side walls of said armored chamber and the outer surface of said compact tire package intended for providing free radial expanding of said compact tire package under the effect of explosion prior to forming a stress-strain distribution of the material of said compact tire package, providing destruction and shredding said material of said compact tire package into finely divided fractions sizing 1 to 6 mm free from metallic inclusions;
said free space limited to said inner surface of said side walls of said armored chamber has a diameter which in any cross section square with the chamber longitudinal axis and passing through the compact tire package varies from 2 to 7 compact tire package diameters in said cross section;
a means for loading a compact tire package into said armored chamber and a means for arranging said package therein;
a means for accommodating explosive charge in said center hole of said compact tire package;
a means for initiating an explosion arranged in said explosive charge;
a means for withdrawing the explosion products; and
a means for unloading the products of shredding said compact tire package.

2. A device as claimed in claim 1, wherein:
said compact tire package is shaped as a cylinder with the ratio of the height thereof to said diameter of said compact package ranges from 2 to 5.

3. A device as claimed in claim 1, wherein:
said compact tire package has a diameter the ratio of which to the diameter of said axial hole for the explosive to accommodate in any cross section square with the longitudinal axis of said armored chamber and passing through said compact tire package ranges from 1.8 to 5.0.

4. A device as claimed in claim 3, wherein:
said explosive is shaped as an elongated charge accommodated in said axial hole.

5. A device as claimed in claim 4, wherein:
the ratio between the diameter of said axial hole in said armored chamber and the diameter of said elongated charge is from 1.5 to 5.0.

6. A device as claimed in claim 5, wherein:
the ratio of the weight of said elongated charge to the weight of said tire package is from 0.03 to 0.07.

7. A device as claimed in claim 1, wherein:
said compact tire package is shaped as a cone frustum;
said armored chamber is shaped as a cone frustum;
said free space limited to the inner surface of said side walls of said armored chamber has a diameter which in any cross section square with the chamber longitudinal axis and passing through the compact tire package varies from 2 to 7 compact tire package diameters in said cross section.

* * * * *